(12) United States Patent
Lemay

(10) Patent No.: US 11,892,022 B2
(45) Date of Patent: *Feb. 6, 2024

(54) REMOVABLE STUDS, TOOL FOR INSERTING AND REMOVING SAME AND KIT COMPRISING STUDS AND TOOL

(71) Applicant: IGRIP STUD INC., Laurier-Station (CA)

(72) Inventor: Patrick Lemay, Laurier-Station (CA)

(73) Assignee: IGRIP STUD INC., Laurier-Station (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,999

(22) Filed: Oct. 22, 2021

(65) Prior Publication Data

US 2022/0042537 A1 Feb. 10, 2022

Related U.S. Application Data

(63) Continuation of application No. 15/262,755, filed on Sep. 12, 2016, now Pat. No. 11,255,366.

(51) Int. Cl.
*F16B 23/00* (2006.01)
*B60C 11/16* (2006.01)
*B25B 13/50* (2006.01)
*B25B 13/08* (2006.01)

(52) U.S. Cl.
CPC .......... *F16B 23/0038* (2013.01); *B25B 13/08* (2013.01); *B25B 13/50* (2013.01); *B60C 11/1668* (2013.01); *F16B 23/0069* (2013.01)

(58) Field of Classification Search
CPC .............. F16B 23/0007; F16B 23/0038; F16B 23/0053; F16B 23/0069; B25B 13/08; B25B 13/50; B60C 11/165; B60C 11/1662; B60C 11/1668; B60C 11/1675
USPC ............ 411/402, 403, 410; 81/176.15, 176.2
See application file for complete search history.

(56) References Cited

U.S. PATENT DOCUMENTS

| | | | |
|---|---|---|---|
| 1,867,372 A | 7/1932 | McGuckin | |
| 2,459,610 A | 1/1949 | Zadina | |
| 2,506,801 A | 5/1950 | MacNeill | |
| 3,073,206 A | 1/1963 | Rudolph | |
| 3,120,863 A | 2/1964 | Coate | |
| 3,354,756 A * | 11/1967 | Rusk | B25B 13/48 81/176.15 |
| 3,404,718 A | 10/1968 | Smith | |
| 3,742,789 A | 7/1973 | Rusk et al. | |
| 4,063,372 A | 12/1977 | MacNeill | |
| 4,723,366 A | 2/1988 | Hagger | |
| 5,033,211 A * | 7/1991 | Latraverse | A43C 15/165 36/134 |
| 5,458,174 A | 10/1995 | Wessel | |
| 5,865,078 A | 2/1999 | Langford | |
| 5,897,177 A | 4/1999 | Bergstrom | |
| 6,102,642 A | 8/2000 | Kawashita et al. | |
| 6,402,447 B1 * | 6/2002 | Babak | F16B 35/06 411/14 |
| 6,502,332 B1 | 1/2003 | Nakayama | |
| 6,513,266 B1 | 2/2003 | Ijiri | |
| 6,872,041 B2 | 3/2005 | Lohr | |
| 7,207,248 B2 | 4/2007 | Panasik et al. | |

(Continued)

*Primary Examiner* — Brian D Keller
*Assistant Examiner* — Marcel T Dion
(74) *Attorney, Agent, or Firm* — Volpe Koenig

(57) ABSTRACT

The present invention provides a stud and tool to remove the same.

8 Claims, 4 Drawing Sheets

(56) References Cited

U.S. PATENT DOCUMENTS

| | | |
|---|---|---|
| 7,695,078 B2 | 4/2010 | Lefgren |
| 8,429,875 B2 | 4/2013 | Bartlett |
| 9,593,705 B2 * | 3/2017 | Call ................... F16B 25/0042 |
| 11,255,366 B2 * | 2/2022 | Lemay ................... B60C 11/16 |
| 2005/0269878 A1 | 12/2005 | Lefgren |
| 2009/0145270 A1 * | 6/2009 | Heesch ................ B25B 15/007 |
| | | 81/436 |
| 2011/0318138 A1 * | 12/2011 | Anderson ............... F16B 21/02 |
| | | 24/456 |
| 2015/0086294 A1 * | 3/2015 | Selle ................... F16B 23/0023 |
| | | 470/11 |
| 2016/0208840 A1 | 7/2016 | Neber |
| 2017/0348834 A1 | 12/2017 | Miller et al. |

* cited by examiner

REMOVABLE STUDS, TOOL FOR INSERTING AND REMOVING SAME AND KIT COMPRISING STUDS AND TOOL

CROSS REFERENCE TO RELATED APPLICATIONS

This application is a continuation of U.S. patent application Ser. No. 15/262,755, which was filed Sep. 12, 2016, which is incorporated herein by reference as if fully set forth.

FIELD

The present invention pertains to the field of studs and in particular to removable studs, a tool for inserting and removing studs, and a kit comprising both studs and the tool.

BACKGROUND

Studs are used on tires to increase tire traction on a wide range of vehicles. A tire may require further traction to improve vehicle control on specific surfaces such as snow and ice.

Conventionally studs are mounted on vehicle tires which have small radial holes arranged in the tread area of the tire. The studs are forced into the holes by pressure, which press the studs into the holes to displace the rubber around the stud, thereby retaining the stud in position. This installation requires cumbersome, and expensive specialized tools. Once a stud is installed, it is generally recommended that it not be removed.

Generally, tires are purchased with the studs pre-installed. This does not provide the consumer or user the ability to decide the placement or number of studs that are installed in a tire.

Studs may be removed from a tire or replaced, and generally this is done by a tire retailer. Stud removal can be hampered by wear and tear on the stud. In addition, tools for removal can be rendered ineffective due to build-up of material on the stud, during use of the tire.

Studs may also be used to improve the traction of footwear. Footwear may require further traction to improve an individual's control or grip on specific surfaces. Studs may be removed from footwear or replaced, however footwear stud removal can be hampered by wear and tear on the stud. Tools for footwear stud removal can be rendered ineffective due to build-up of material on the footwear stud, caused by the use of the footwear.

Therefore, there is a need for a removable stud that is easily installed and removed and able to avoid material that may build up on the stud. There is a further need for a tool to facilitate installation and removal of a stud that is still effective after stud use.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide removable studs, tool for inserting and removing the same, and a kit comprising studs and tool. In accordance with an aspect of the present invention, there is provided a stud comprising a hexagonal head portion with a notched flange connected to a threaded shank portion; wherein the notched flange portion has two diametrically opposed notches and wherein each notch is centered on a vertex of the hexagonal head.

In accordance with another aspect of the present invention, there is provided a stud installation and removal device configured to install and remove the stud discussed above, the device comprising an elongated shaft; connected to a wrench head, the wrench head comprising a neck with two substantially diametrically opposed walls extended therefrom; each wall having an interior face configured to receive a vertex of the hexagonal head of the stud, each wall further comprising a tip portion configured for the notch of the stud, wherein gaps are provided between the two walls.

In accordance with another aspect of the present invention, there is provided a kit comprising the stud installation and removal device and a plurality of studs.

BRIEF DESCRIPTION OF THE DRAWINGS

Embodiments of the present invention will be better understood in connection with the following Figures, in which.

DETAILED DESCRIPTION

Figure 1:
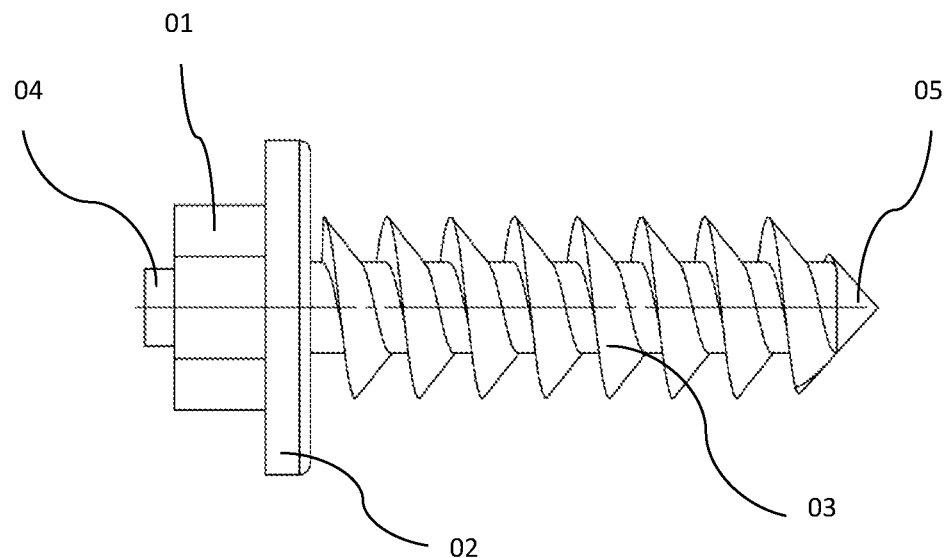
FIG. 1 illustrates a side view of the stud of one embodiment of the invention, detailing a hexagonal head portion, the notched flange portion, the threaded shank, a head protrusion, and a pointed tip.

This invention provides studs and a device for installation and removal of same. Also provided are kits comprising a plurality of studs, a stud installation and removal device and optionally instructions for use. The studs can be various sizes and are sized according to the application. For example, smaller studs may be used on footwear; whereas larger studs may be used on vehicle tires. The stud installation and removal device is sized to fit the stud. In some embodiments, the studs and stud installation and removal device are sold separately. Alternatively, the studs and stud installation and removal device are provided together as a kit. In some embodiments, the kits include a variety of sized studs and corresponding devices.

The stud of the invention includes a hexagonal head portion with a notched flange connected to a threaded shank portion. The notched flange portion has two diametrically opposed notches. Each notch is centered on a vertex of the hexagonal head. In some embodiments, the notches are narrowed proximal to the outside edge of the flange. Generally, both notches are substantially identical and extend the full width and depth of the flange.

The present invention also provides a stud installation and removal device configured to install and remove the studs of the invention. The device comprises an elongated shaft connected to a wrench head. The wrench head comprises a neck with two substantially diametrically opposed walls extended therefrom; each wall having an interior face configured to receive a vertex of the hexagonal head of the stud. Gaps are provided between the two walls. Each wall further comprising a tip portion configured to fit in a notch of the stud. The wrench head is designed to accommodate the hexagonal head portion of the stud. The two walls of the wrench head are designed to the fit within the notches of the flange portion of the stud. The stud installation and removal device is designed to include two gaps in the wrench head portion to allow for escape of debris during use, regardless of build-up of material upon the stud.

The neck of the wrench head or the elongated shaft may be inserted into a drill chuck in order to allow a user to remove and install a stud using a drill. In one embodiment, the user installs a stud using the aperture at the elongated shaft of the device and the user removed a stud using the wrench head of the device.

In some embodiments, the stud installation and removal device is two headed. The first end comprising the wrench head and the second end comprising a hexagonal-shaped depression sized to accommodate a screw head. The second side may be used to install the stud or for connection to a drill chuck extension.

In one embodiment, it is contemplated that a stud is configured to be inserted into or removed from a shoe, boot, sandal, or other footwear as would be understood by someone skilled in the art.

In one embodiment, it is contemplated that the stud is configured to be inserted into, or removed from the tire of a vehicle such as but not limited to a car, truck, jeep, van, minivan, bus, coach, transport truck, motorcycle, moped, utility vehicle, sport utility vehicle, military vehicle, heavy machinery, pneumatic machinery, farming equipment, bicycle, tricycle, skateboard, all-terrain vehicle ("ATV"), motocross bike, dirt bike, amphibious vehicle, rickshaw, electric vehicle, golf cart, wagon, trailer, ice resurfacer, snow groomer or other vehicle as would be understood by someone skilled in the art.

In one embodiment, it is contemplated that the stud and stud installation and removal device may be used for vehicles within the recreational, transport, mining, forestry, construction or other industry as would be understood by someone skilled in the art.

In one embodiment, it is contemplated that the stud may be inserted into, or removed from one tire, or multiple tires of a vehicle. This removal may be done by the vehicle user using an inexpensive tool such as a drill. This method makes stud installation inexpensive, easy and portable, such that installation and removal can be done by the user on the field.

In another embodiment, it is contemplated that the stud and stud installation and removal device may be used on new or used tires.

In another embodiment, it is contemplated that the stud and stud installation and removal device may be used on tires designed for one or more seasons.

In one embodiment, it is contemplated that the stud may be made of hot-dipped steel, steel, stainless steel, aluminum, copper, iron, metal, plastic, composite, ceramic or other material as would be understood by someone skilled in the art.

In another embodiment, it is contemplated that the stud may be thermally galvanized with a zinc coating, or some other coating as would be understood by someone skilled in the art to improve the stud ability to withstand environmental conditions.

In one embodiment, it is contemplated that the construction of the stud may be unitary.

In one embodiment, it is contemplated that the construction of the stud may be made in separate pieces and assembled.

In another embodiment, it is contemplated that certain components or parts of the stud may be comprised of different materials to improve the capabilities of the stud, as would be understood by someone skilled in the art. For example, the stud may have a tungsten carbide thread tip which is welded to each stud to amplify continuous traction of the stud.

In one embodiment, it is contemplated that the stud installation and removal device may be made of hot-dipped steel, steel, aluminum, copper, iron, metal, plastic, composite, or other material as would be understood by someone skilled in the art.

In another embodiment, it is contemplated that the stud installation and removal device is thermally galvanized with a zinc coating, or some other coating as would be understood by someone skilled in the art to improve the stud ability to withstand environmental conditions.

In one embodiment, it is contemplated that the construction of the stud installation and removal device is unitary.

In one embodiment, it is contemplated that the construction of the stud installation and removal device may be made in separate pieces and assembled.

In another embodiment, it is contemplated that certain components of the stud installation and removal device are comprised of different materials to improve the capabilities of the device, as would be understood by someone skilled in the art. For example, the device may have a tungsten carbide or titanium carbide tip portion which is welded, pressed, glued or otherwise coupled to each stud installation and removal device.

In one embodiment, it is contemplated that the size of the stud is varied to suit a specific vehicle or condition. Portions of the stud may similarly be varied to suit a specific vehicle or condition including but not limited to the thickness of a tire. For example, a stud may be made larger overall to better suit heavy machinery. Alternatively, a stud may be made smaller overall to better suit footwear. A stud head portion may be made larger to provide greater traction on ice.

The size of the stud installation and removal device will be varied to suit the specific size of a stud. For example, the wrench head of the device may be made larger to suit a larger head portion of the stud. The shaft portion of the device may be made smaller to suit the drill chuck of a smaller drill. Various device may have the same sized elongated shaft.

Stud

It is contemplated that the stud head portion is hexagonal in shape. The hexagonal shape is suited to fit into a hexagonal cavity within the stud installation and removal device. The top surface of the head portion may be flat, or may comprise a head protrusion. The head protrusion may be a cylindrical protrusion that of the head portion, extending slightly away from the head portion.

The depth of the head portion may be varied and in some embodiments make up about a fifth of the entire length of the stud. In another embodiment, it is contemplated that the stud head portion depth may make up less than, or more than a fifth of the entire length of the stud, to facilitate additional or alternative functionality of the head portion. For example, the head portion may extend to make up half of the entire length of the stud, in order to provide further traction surface area for particularly soft surfaces such as mud. The additional length of the head portion may also facilitate easier installation and removal of the stud within a tire.

In another embodiment, it is contemplated that the top surface of the head portion may be rounded, conical, convex, concave, or some other shape as would be understood by someone skilled in the art.

In another embodiment, it is contemplated that the top surface of the head portion may not comprise a head protrusion.

In another embodiment, it is contemplated that the head protrusion may be spiked, flat, circular, triangular, diamond, square, oval, pentagonal, hexagonal, heptagonal, octagonal, or some other shape as would be understood by someone skilled in the art.

In another embodiment, it is contemplated that the head protrusion may extend further away from the head portion to facilitate additional or alternative functionality of the stud. For example, the head protrusion may extend to make up a quarter of the entire length of the stud, in order to provide further traction capabilities.

The stud head portion is connected to the notched flange portion. The notched flange radially extends outwards from the head portion. The notched flange portion has two diametrically opposed notches, each of which is centered on a vertex of the hexagon. The two notches therefore appear generally m-shaped with the center point of the "m" formed by the vertex of hexagonal head portion. The notches generally have a narrower portion at the flange's outer edge which opens into a wider portion proximal to the vertex of hexagonal head portion. The narrower portion of the notch at the flange's outer edge assists in providing the flange strength and increased contact surface when coupled with a tire or footwear. As opposed to apertures where direct or foreign objects can become lodges, the notches opening at the flange's outer edge assists in preventing buildup of dirt or other foreign objects in the notch area. The narrower portions of the notch at the flange's outer edge also assist in providing increased flange surface area.

The notched flange portion is shaped to suit a stud installation and removal device. Specifically the two notches of the stud configured to accommodate the tip portion of the device.

When the stud is installed in a tire or shoe, the notched flange portion is configured to be slightly embedded within the surface of the tire or shoe. The notched flanged portion prevents the head portion from being inserted too deep within the tire during installation.

In another embodiment, the thread portion is connected to the notched flange portion. In some embodiments, the thread portion may be tapered or pointed at the thread portion end. The threading on the thread portion may begin slightly below the notched flange portion, and continue away from the notched flange portion through the entirety of the thread portion. Alternatively, the shank is threaded along its total length, optionally the thread may be varied over the length of the shank.

The thread portion is helical and has two angled surfaces. In one embodiment, the top edge of the thread portion has an angle of approximately 90 degrees with the shank and the cutting edge has an angle of approximately 40 degrees from the outer portion of the top edge of the thread portion. The angle of the top edge assists in preventing the stud from being dislodged from the coupled surface. The angle of the cutting edge facilitates entry into a surface.

In some embodiments, it is contemplated that the thread portion may extend without narrowing, from the head portion to a thread portion tip. The thread portion tip may be conical is shape, coming to a point at the end furthest away from the head portion. It is also contemplated that different parts of the thread portion may be made of different materials.

The crest of the thread may be varied according to application. In some of the embodiments, the crest of the thread at its widest has a diameter substantially the same as the diameter of the head of the stud. Alternative, the crest of the thread at its widest has a diameter that is less than the diameter of the head of the stud.

In another embodiment, it is contemplated that the thread portion, and/or thread portion tip may be shaped to suit a specific functional purpose. For example, the thread portion may be straight, curved, broaden, flare, narrow, or otherwise as would be understood by someone skilled in the art. In another example, the thread portion tip may be shaped as a pyramid, point, blunt end, ball point, or otherwise as would be understood by someone skilled in the art.

In another embodiment, it is contemplated that the thread portion may include a non-threaded portion. Alternatively the thread portion may be bare, rounded, spiral, or otherwise as would be understood by someone skilled in the art. The non-threaded portion may include annular rings, notches, cutouts, holes, or otherwise as would be understood by someone skilled in the art.

In another embodiment, it is contemplated that the threading on the thread portion may begin immediately below the notched flange portion, and continues away from the notched flange portion through the entirety of the thread portion. It is also contemplated that the threading on the thread portion may not be continuous through the entirety of the thread portion. The threading may be imposed on part of the thread portion, or on multiple parts of the thread portion.

Stud Installation and Removal Device—Elongated Shaft

In one embodiment, it is contemplated that the elongated shaft portion may be cylindrical in shape, connected to and extending from the wrench head. The elongated shaft portion may be configured to fit within a drill chuck so that the drill chuck is able to grasp the elongated shaft portion.

In another embodiment, it is contemplated that the shaft portion may contain a depression, a protrusion, or some combination of a depression and a protrusion, designed to facilitate a drill chuck.

In another embodiment, it is contemplated that the shaft portion may be triangular, rectangular, prismatic, pentagonal, hexagonal, heptagonal, octagonal, or otherwise as would be understood by someone skilled in the art.

It is also contemplated that the shaft portion end furthest away from the wrench head comprises an aperture or depression configured to receive the head portion of a stud to be affixed to a surface. In one embodiment, the aperture or depression has a hexagonal shape only slightly larger than the stud to be coupled to a surface and had a depth of at least the height of the head portion. In some embodiments, the aperture or depression includes a rounded end to receive the head protrusion of the head portion of a stud.

Stud Installation and Removal Device—Wrench Head

The wrench head comprises a neck with two substantially diametrically opposed walls extended therefrom. The walls having an interior face configured to receive a vertex of the head of the stud. In one embodiment, the walls have an interior face configured to receive a vertex of a hexagonal head of the stud. The walls have a height that is greater than the height of stud head such that when the stud is in place there is a gap between the top of the stud and the base of the neck. Each wall further comprises a tip portion configured for the notch of the stud. The tips have an interior face configured to receive a vertex of the hexagonal head of the stud. Gaps are provided between the two walls.

The neck may be configured to fit within a drill chuck so that the drill chuck is able to firmly grasp the neck. In one embodiment, the diameter of the neck is slightly smaller than the diameter of the elongated shaft.

In one embodiment, the neck contains at least one depression, protrusion, shape, or some combination thereof, designed to facilitate the head portion of a stud.

It is contemplated that the neck may be cylindrical, triangular, rectangular, prismatic, pentagonal, hexagonal, heptagonal, octagonal, or otherwise as would be understood by someone skilled in the art.

Use of Stud Installation and Removal Device

In one embodiment, in order to install a stud to a surface using the stud installation and removal device, the user inserts and secures the neck of wrench head of the device within a drill chuck of a drill. The user then inserts the head portion of the screw within the aperture at the end of the elongated shaft and can thereafter affix the stud to the surface. The aperture at the end of the elongated shaft is generally stronger and more durable than the configuration of the wrench head and is therefore preferred to screw the studs into surfaces.

In order to remove a screw from a surface using the stud installation and removal device, the user inserts and secures the elongated neck of the device within a drill chuck of a drill. In this portion, the wrench head of the device is exposed and secured for use. The user then inserts the wrench head over the head portion of the stud with each the tip portions of the walls of the wrench head fixing within the notches of flange portion of the stud. The tips are particularly useful and in some cases necessary for the removal of the stud, when the head of the stud is worn down and its side walls cannot properly grip the walls of the wrench head.

In an alternative embodiment, the wrench head of the device is used to not only to install the studs but also to remove studs from a surface.

Stud Kit

In one embodiment, it is contemplated that studs and/or a stud installation and removal device may be sold to consumers individually. In another embodiment, it is contemplated that studs and/or a stud installation and removal device may be sold as a kit to consumers. It is also contemplated that studs may be sold to consumers in various package sizes, to suit the users' needs. It is further contemplated that studs may be sold to consumers in various packages which may include a detachable measuring tool and/or an installation diagram and instructions on how to use the device and studs.

Examples

The invention will now be described with reference to specific examples. It will be understood that the following examples are intended to describe embodiments of the invention and are not intended to limit the invention in any way.

Figure 2:
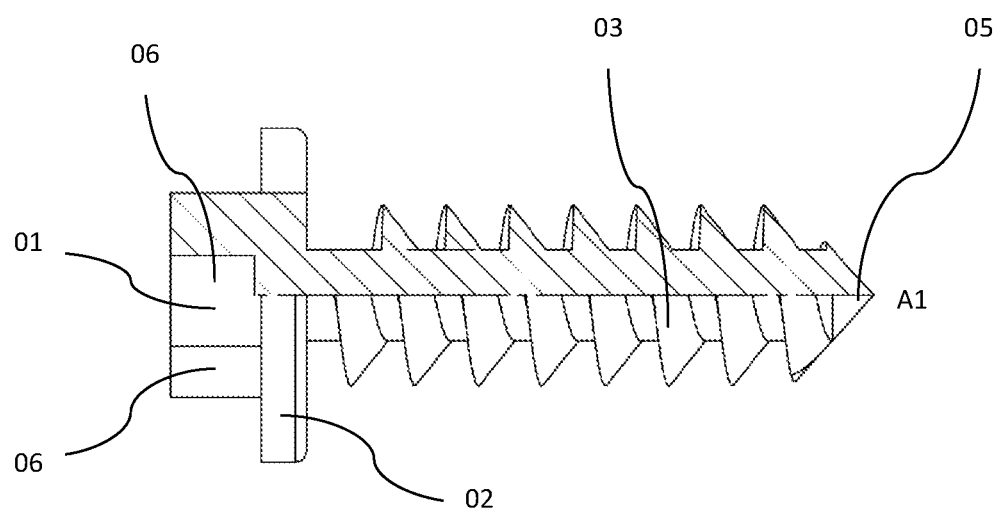
FIG. 2 illustrates a side, cut out view of FIG. 1 at A1, detailing the hexagonal head portion, a notched flange portion, a thread shank, and pointed tip.

In one example as illustrated in FIGS. 1 and 2, it is contemplated that the hexagonal head portion 1 is connected to a notched flange portion 2, which is connected to a thread shank 3. The top of the head portion includes a head protrusion 4, and the threaded shank ends in pointed tip 5. The stud head portion has six flat sides 6 to make up a head portion that is hexagonal in shape.

Figure 3:
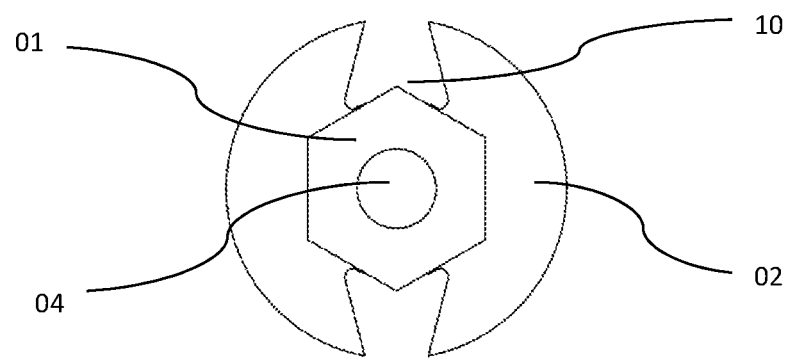
FIG. 3 illustrates a top view of the stud, specifically the head portion and notched flange portion of the stud of FIG. 1.
Figure 4:
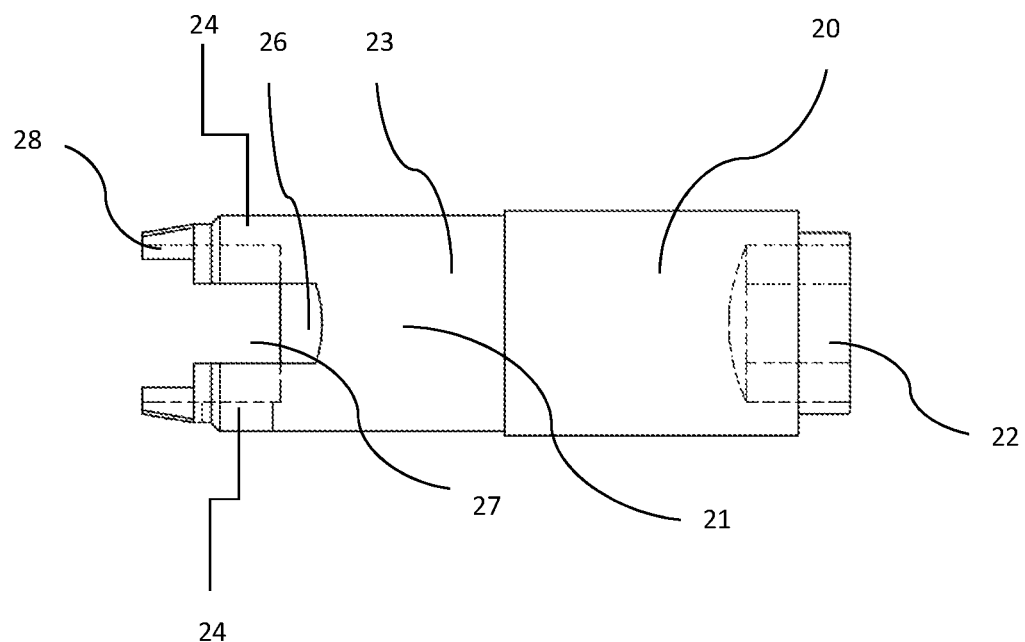
FIG. 4 illustrates a side view of the stud installation and removal device, detailing an elongated shaft with a hexagonal-shaped depression sized to fit the screw head. This side of the device may be used to install the screw or for connection to a drill chuck extension. The device also comprises a wrench head adapted to facilitate the removal of studs. The wrench head comprises a neck with two substantially diametrically opposed walls extended therefrom. Also shown is a tip portion configured for the notch of the stud and gaps the provided between the two walls. The hatched line on the left side of the figure details outline of the stud head.
Figure 5:
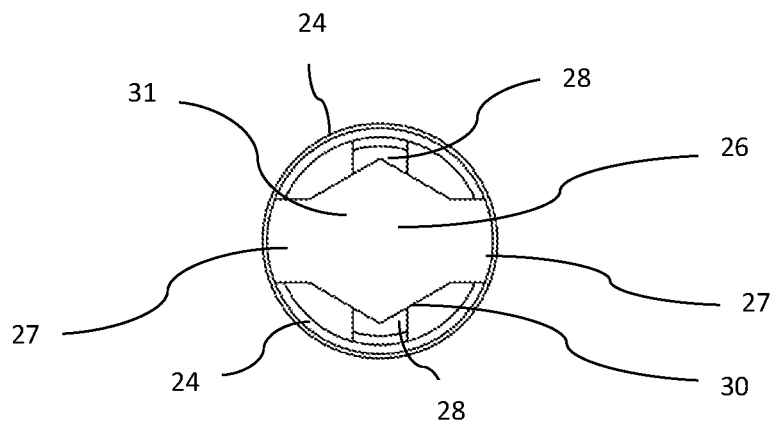
FIG. 5 illustrates an alternate view of the stud installation and removal device of FIG. 4, specifically a view from the bottom showing the two walls.
Figure 6:
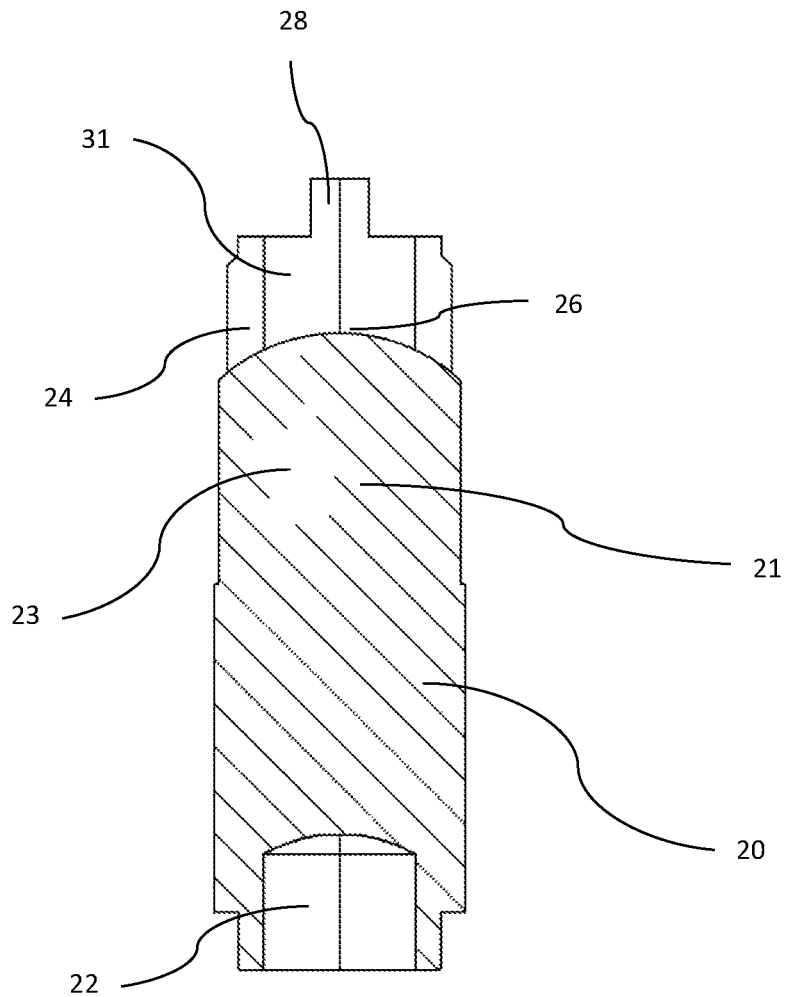
FIG. 6 illustrates a cross-sectional view of the stud installation and removal device, detailing elongated shaft with a depression configured for connection to a drill chuck or drill chuck extension, and wrench head comprising a neck with wall extended therefrom. Also shown is a tip portion configured for the notch of the stud.
Figure 7:
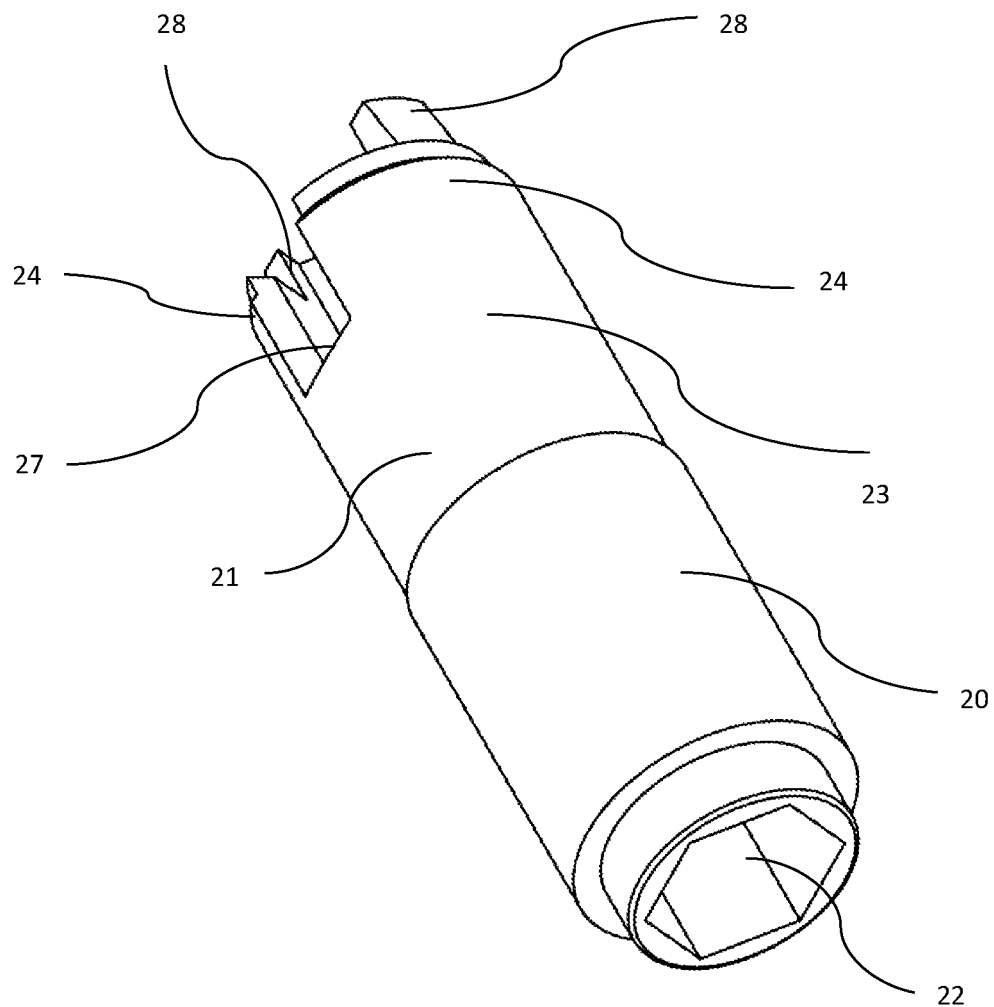
FIG. 7 illustrates a prospective view of the stud installation and removal device, detailing an elongated shaft with a depression configured for connection to a drill chuck or drill chuck extension, and wrench head comprising a neck with wall extended therefrom. Also shown is a tip portion configured for the notch of the stud.
Figure 8:
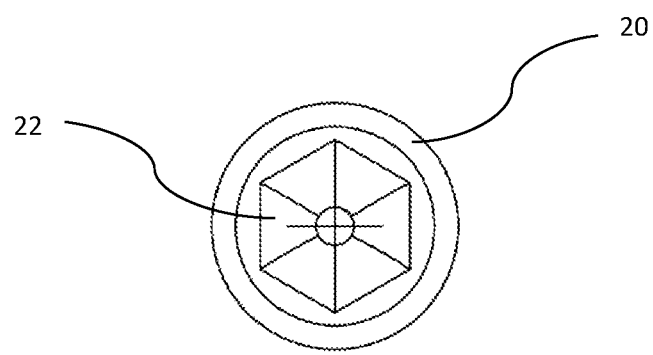
FIG. 8 illustrates a view of the stud installation and removal device, specifically the view is shows the end of the elongated shaft with hexagonal-shaped depression.

As illustrated in FIG. 3 the stud head portion 1 includes a notched flange portion 2. The top of the head portion includes a head protrusion 4, while the notched flange portion includes two diametrically opposed notches 10, each of which is centered on a vertex of the hexagon of the head portion 1. The two notches 10 therefore appear generally m-shaped with the center point of the "m" formed by the vertex of hexagonal head portion 1. The notches 10 have a narrower portion at the flange portion's 2 outer edge which opens into a wider portion proximal to the vertex of hexagonal head portion 1. As illustrated in FIGS. 4-8, in one embodiment the stud installation and removal device comprises an elongated shaft 20 connected to a wrench head 21. The elongated shaft portion contains a depression 22 configured to accommodate the head portion 1 of a stud. The most inner portion of the depression 22 is configured to accommodate the head protrusion 4 of the head portion 1. The wrench head 21 includes a neck portion 23 with two substantially diametrically opposed walls 24 extended therefrom. Each wall 24 includes a tip portion 28. Together the walls 24 form an opening 31 configured to accommodate the head portion 1 of the stud, and are sized to provide gaps 27 between the head potion 1 of the stud within the wrench head 21 and the base 26 of the wrench head 21 to allow for escape of debris on the head portion 1 during use. It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The scope of the claims should not be limited by the preferred embodiments set forth in the examples, but should be given the broadest interpretation consistent with the description as a whole.

What is claimed is:

1. A removable tire stud consisting of:
   a solid hexagonal shaped head portion having a top surface, the head portion being continuous with a threaded, pointed shank portion;
   a notched flange fixed to the head portion proximal to the threaded, pointed shank portion;
   wherein the notched flange has two diametrically opposed notches in an outer edge thereof, wherein each notch is centered on a vertex of the hexagonal shaped head, and
   wherein each notch generally has an m-shape with a center point formed by the vertex of the hexagonal shaped head portion.

2. The stud of claim 1, wherein the shank has a total length and is threaded along the total length.

3. The stud of claim 1, wherein the threaded shank has a uniform thread.

4. The stud of claim 1, wherein a crest of the thread has a diameter less than a width of the head.

5. The stud of claim 1, wherein the top surface has a head protrusion.

6. The stud of claim 5, wherein the head protrusion is a circular protrusion.

7. The stud of claim 1, wherein construction of the stud is unitary.

8. The stud of claim 1, wherein each notch extends from the head through the flange.

* * * * *